Sept. 7, 1926.  J. J. SCHILDER  1,599,187
PERCOLATOR
Filed May 17, 1926      2 Sheets-Sheet 2
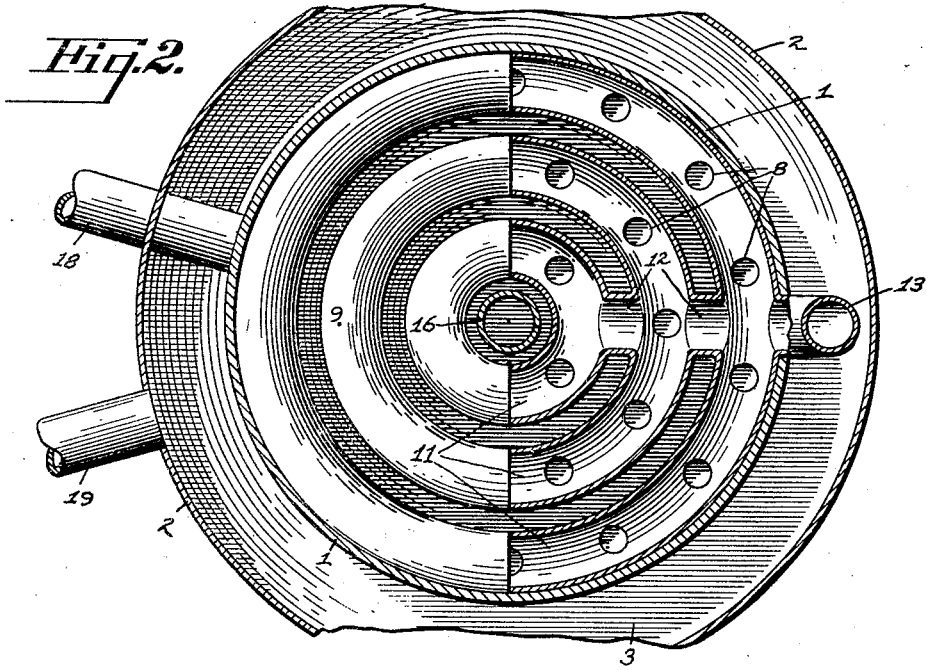
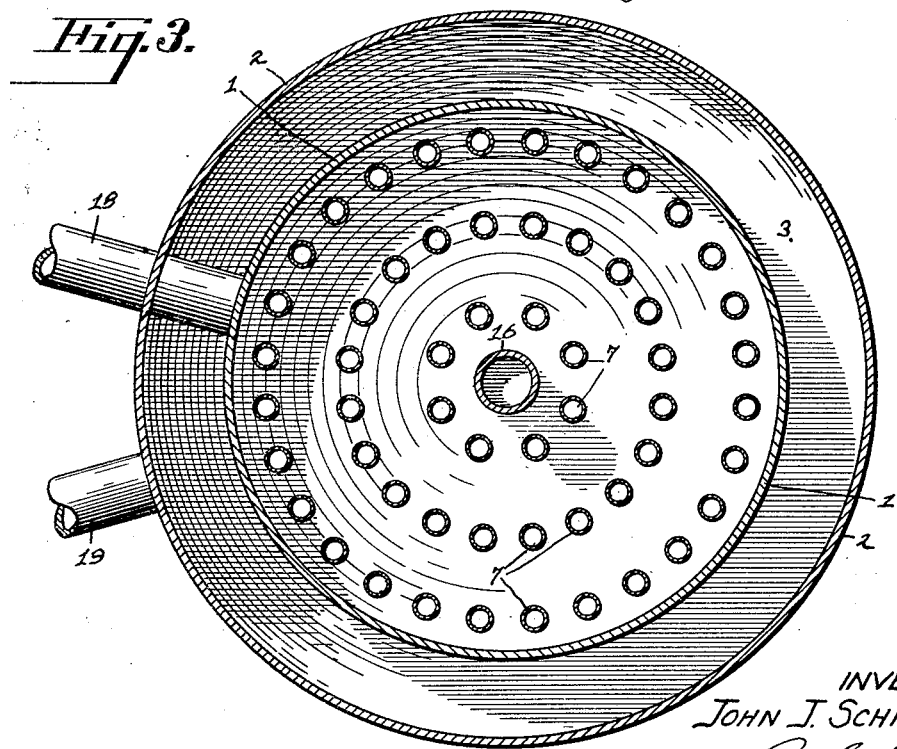
INVENTOR
JOHN J. SCHILDER
BY Arthur L. Slee
ATTY.

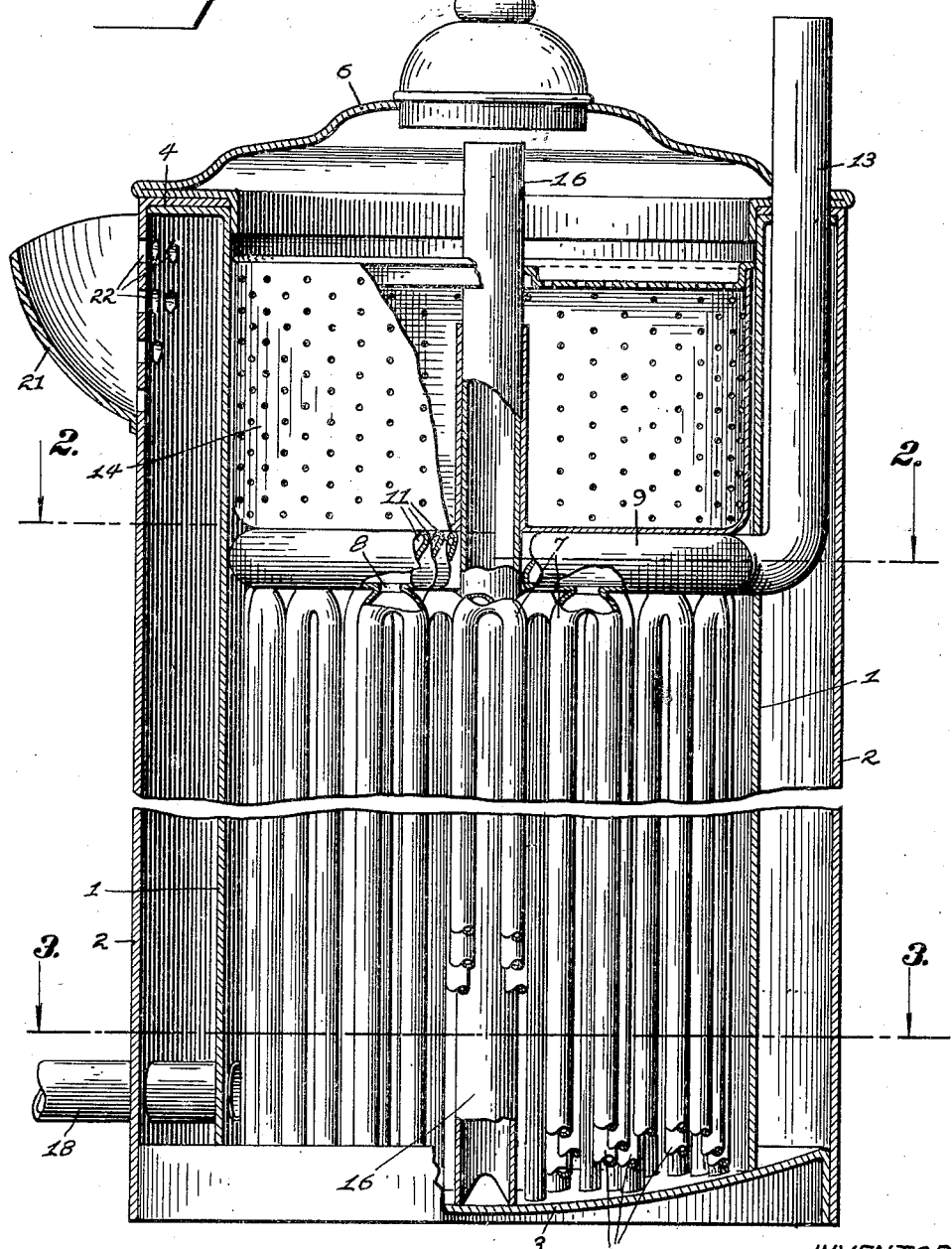

Patented Sept. 7, 1926.

1,599,187

UNITED STATES PATENT OFFICE.

JOHN J. SCHILDER, OF SAN FRANCISCO, CALIFORNIA.

PERCOLATOR.

Application filed May 17, 1926. Serial No. 109,613.

My invention relates to improvements in percolators for making coffee and the like, wherein water heated within the lower portion of a container is conducted upwardly by a percolator and caused to leach coffee or other substance placed within a filter cup within the upper portion of the container.

The primary object of my invention is to provide an improved coffee percolator.

Another object is to provide an improved device wherein a relatively large quantity of water may be quickly and efficiently heated and percolated.

A further object is to provide an improved device wherein heat passages and a vent member are arranged to obtain increased heating surface and to form a support for a filter cup within a container.

Another object is to provide a device of the character described, having an outer compartment arranged to receive a separate quantity of cream or other liquid to be heated.

A further object is to provide an improved device which can be removably placed over any gas burner or other heating device without the provision of special mountings or the like.

A still further object is to provide an improved construction which can be economically manufactured and which will form an efficient means for making coffee and maintaining said coffee and a supply of cream therefor in heated condition.

I accomplish these and other objects by means of the improved device disclosed in the drawings forming a part of the present specification, wherein like characters of reference are used to designate similar parts throughout said specification and drawings and in which—

Fig. 1 is a broken vertical section of my improved percolator; and

Figs. 2 and 3 are transverse sectional views taken upon the lines 2—2 and 3—3 of Fig. 1, respectively.

Referring to the drawings, my improved percolator will be seen to consist of a container having spaced inner and outer walls 1 and 2, respectively, forming inner and outer compartments. The container is preferably made cylindrical in form and is provided with a concave bottom member 3 closing the lower ends of both inner and outer compartments. The top of the outer compartment is preferably closed in any suitable manner as at 4, and a removable cover 6 is provided for covering the inner compartment.

A plurality of tubular members 7 are mounted within the lower portion of the inner compartment, said members being vertically disposed and opening outwardly through the bottom member 3 to which the lower ends of said tubular members 7 are secured. The tubular members 7 are preferably formed in U shape and arranged in annular rows within the inner compartment. Openings 8 are formed in the bent upper ends of the tubular members 7.

A vent member 9 is mounted upon the tops of the tubular members 7, said member consisting of a plurality of annular passages 11 communicating with the openings 8 in the tops of the tubular members 7 and connected through a passage 12 to a common outlet vent 13 extended outwardly from the inner to the outer compartment and thence upwardly through the top of the container.

The vent member 9 forms a platform within the upper portion of the inner compartment upon which is placed a suitable filter cup 14 arranged to receive a quantity of coffee or other substance to be leached.

A percolator tube 16 is mounted within the center of the inner compartment, said tube extending upwardly past the vent member 9 and through the filter cup 14 to a point just below the cover 6. Openings 17 are formed in the bottom of the tube 16 to admit water thereinto, said water being conducted upwardly through the tube and delivered above the top of the filter cup.

Tubular outlets 18 and 19 are connected into the bottom portions of the inner and outer compartments, respectively, said outlets being provided with suitable cocks, not shown, through which the liquid contents of said compartments may be drawn off.

A filter lip 21 is secured upon the outer wall 2 near the top thereof and around a plurality of openings 22 formed therein, whereby liquid may be poured into the outer compartment.

In operation the inner compartment formed by the wall 1 is partially filled with water and a supply of coffee or other substance introduced into the filter cup. Cream or other liquid to be heated is introduced into the outer compartment formed by the outer wall or jacket 2. The container is then placed above any heating means, as a burner of a gas stove or the like. The heat from such heating means passes upwardly through the tubular members 7 to the vent member 9, said tubular members being thus heated and caused to quickly and efficiently heat the water or other liquid contained within the inner compartment and surrounding said tubular members. At the same time, the percolator tube 16 operates to conduct portions of the liquid upwardly to the upper portion of the compartment and to deliver said liquid above the filter cup, said liquid draining down through the coffee or other substance contained within said cup to leach the same in the well known manner.

The cream or other liquid contained in the outer compartment is heated in part by heat transmitted directly through the bottom member 3 and in part by heat absorbed from the inner wall 1, as the liquid within the heated compartment becomes heated.

By my improved construction the water contained within the inner compartment is very quickly heated, the large heating area obtained by the tubes 7 being added to the area of the bottom member 3 to obtain a quick and efficient action. By providing the outer compartment to receive cream or the like, such liquid is separately heated simultaneously with the coffee and without the use of an extra burner and without additional expense. The contents of the inner and outer compartments are readily drawn off through the outlet connections 18 and 19, which are arranged in such manner as to facilitate the introduction of the heated cream into a cup, either before or after the desired amount of coffee has been drawn into the cup.

The device may, of course, be made in various sizes to meet different requirements and may be finished in any manner to obtain an attractive appearance. In the larger sizes, the device is of a relatively light and portable nature, operating in connection with any convenient heating means, and thereby avoiding the expense and inconvenience of permanent installations, such as commonly required by restaurants and the like.

While I have illustrated and described what I now consider to be the preferred construction of my improved percolator, the device is, of course, subject to modification in regard to the details of construction. I, therefore, do not wish to restrict myself to such structural details, but desire to avail myself of any modifications that may fall within the scope of the appended claims.

Having thus described my invention what I claim as new and desire to secure by Letters Patent is:

1. A percolator comprising a container; tubular heat passages mounted within the container and opening outwardly through the bottom of the container; a vent connected to the upper ends of the tubular heat passages; a percolator tube arranged to conduct water from the bottom to the top of the container; and a filter cup mounted within the top of the container to receive substance to be leached by the water.

2. A percolator comprising a container; tubular heat passages mounted within the lower portion of the container and opening outwardly through the bottom of the container; a vent member mounted within the container and communicating with the upper ends of the heat passages, said member comprising a plurality of intercommunicating passages opening into a common outlet; a percolator tube mounted within the container and arranged to conduct water from the lower to the upper portion of the container; and a filter cup mounted upon the top of the vent member to receive substance to be leached by the water.

3. A percolator comprising a container; tubular heat passages mounted within the lower portion of the container, said passages being formed from tubing bent into a U shape and secured in inverted position with the ends opening outwardly through the bottom of the container; a vent member secured upon the upper ends of the inverted U tubes and communicating with said tubes through openings formed in the upper ends of said tubes; a percolator tube mounted within the container to conduct water from the lower to the upper portion of the container; and a filter cup mounted upon the top of the vent member to receive substance to be leached by the water.

4. A percolator comprising a container; tubular heat passages arranged in annular rows and formed from tubes bent into inverted U shape having the ends secured to and opening outwardly through the bottom of the container and having openings formed in the U bend; a vent member secured upon the upper ends of the tubular members and communicating therewith through the openings formed therein; a percolator tube mounted within the container and arranged to conduct water from the lower to the upper portion of the container; and a filter cup resting upon the vent member to receive substance to be leached by the water.

5. A percolator comprising a container; tubular heat passages mounted within the lower portion of the container, said passages being formed from tubes bent and secured in inverted U shape with the lower ends opening outwardly through the bottom of the container and having openings formed in the U bends; a vent member comprising a plurality of spaced passages communicating with a common outlet mounted upon the top of the tubes and communicating therewith through the openings formed in the U bends, said member forming an open elevated platform within the container; a percolator tube mounted within the container and extending upwardly past the vent member to conduct water from the bottom to the upper portion of the container; and a filter cup resting upon the vent member to receive substance to be leached by water from the percolator tube.

6. A percolator comprising a container; tubular heat passages mounted within the lower portion of the container, said passages being formed from tubes bent and secured in inverted U shape with the lower ends opening outwardly through the bottom of the container and having openings formed in the U bends; a vent member comprising a plurality of spaced passages communicating with a common outlet mounted upon the top of the tubes and communicating therewith through the openings formed in the U bends, said member forming an open elevated platform within the container; a percolator tube mounted within the container and extending upwardly past the vent member to conduct water from the bottom to the upper portion of the container; and a filter cup resting upon the vent member to receive substance to be leached by water from the percolator tube; and a jacket mounted around the container in spaced relation to the walls thereof to form a chamber arranged to receive a separate quantity of liquid to be heated.

7. A percolator comprising a container; tubular heat passages mounted within the lower portion of the container, said passages being formed from tubes bent and secured in inverted U shape with the lower ends opening outwardly through the bottom of the container and having openings formed in the U bends; a vent member comprising a plurality of spaced passages communicating with a common outlet mounted upon the top of the tubes and communicating therewith through the openings formed in the U bends, said member forming an open elevated platform within the container; a percolator tube mounted within the container and extending upwardly past the vent member to conduct water from the bottom to the upper portion of the container; and a filter cup resting upon the vent member to receive substance to be leached by water from the percolator tube; a jacket mounted around the container in spaced relation to the walls thereof to form a chamber arranged to receive a separate quantity of liquid to be heated; and cocks connected into the bottom of the container and of the chamber for drawing off the liquid contents thereof.

8. A percolator comprising a container having inner and outer walls forming inner and outer compartments arranged to receive and outer compartments arranged to receive separate quantities of liquid, and provided with a concave bottom permanently closing the bottom of both compartments; a plurality of tubular members mounted within the inner compartment and opening outwardly through the bottom of the container to conduct heat upwardly through liquid contained within said inner compartment; a vent member connected to the upper ends of the tubular members and forming an elevated platform within the inner compartment; a percolator tube extending upwardly from the bottom of the container past the vent member to conduct liquid from the lower to the upper portion of the container; and a filter cup resting upon the vent member and arranged to receive a quantity of substance to be leached.

9. A percolator comprising a container having spaced inner and outer walls forming inner and outer compartments arranged to receive separate quantities of liquid, and provided with a concave bottom permanently closing the bottom of both compartments, the outer compartment being also closed at the top; a plurality of tubular members mounted within the lower portion of the inner compartment to conduct heat through liquid contained therein; a bent member connected to the upper ends of the tubular members and forming an elevated platform within the inner compartment; a percolator tube resting upon the bottom of the container and extending upwardly past the vent member; a filter cup resting upon the vent member and arranged to receive substance to be leached; and a removable cover arranged to close the top of the inner compartment.

10. A percolator comprising a container having spaced inner and outer walls forming inner and outer compartments arranged to receive separate quantities of liquid, and provided with a concave bottom permanently closing the bottom of both compartments, the outer compartment being also closed at the top; a plurality of tubular members mounted within the lower portion of the inner compartment to conduct heat through liquid contained therein; a bent member connected to the upper ends of the tubular members and forming an elevated platform within the inner compartment; a percolator tube resting upon the bottom of the container and extending upwardly past the vent member; a filter cup resting upon the vent member and arranged to receive substance to be leached; and a removable cover arranged to close the top of the inner compartment; and means for filling the outer compartment.

11. A percolator comprising a container having spaced inner and outer walls forming inner and outer compartments arranged to receive separate quantities of liquid, and provided with a concave bottom permanently closing the bottoms of both compartments, the outer compartment being also closed at the top; a plurality of tubular members mounted within the lower portion of the inner compartment to conduct heat through liquid contained therein; a bent member connected to the upper ends of the tubular members and forming an elevated platform within the inner compartment; a percolator tube resting upon the bottom of the container and extending upwardly past the vent member; a filter cup resting upon the vent member and arranged to receive substance to be leached; and a removable cover arranged to close the top of the inner compartment; means for filling the outer compartment; and cocks connected to the inner and outer compartments for drawing off the contents of said compartments separately.

In witness whereof, I hereunto set my signature.

JOHN J. SCHILDER.